No. 776,643. Patented December 6, 1904.

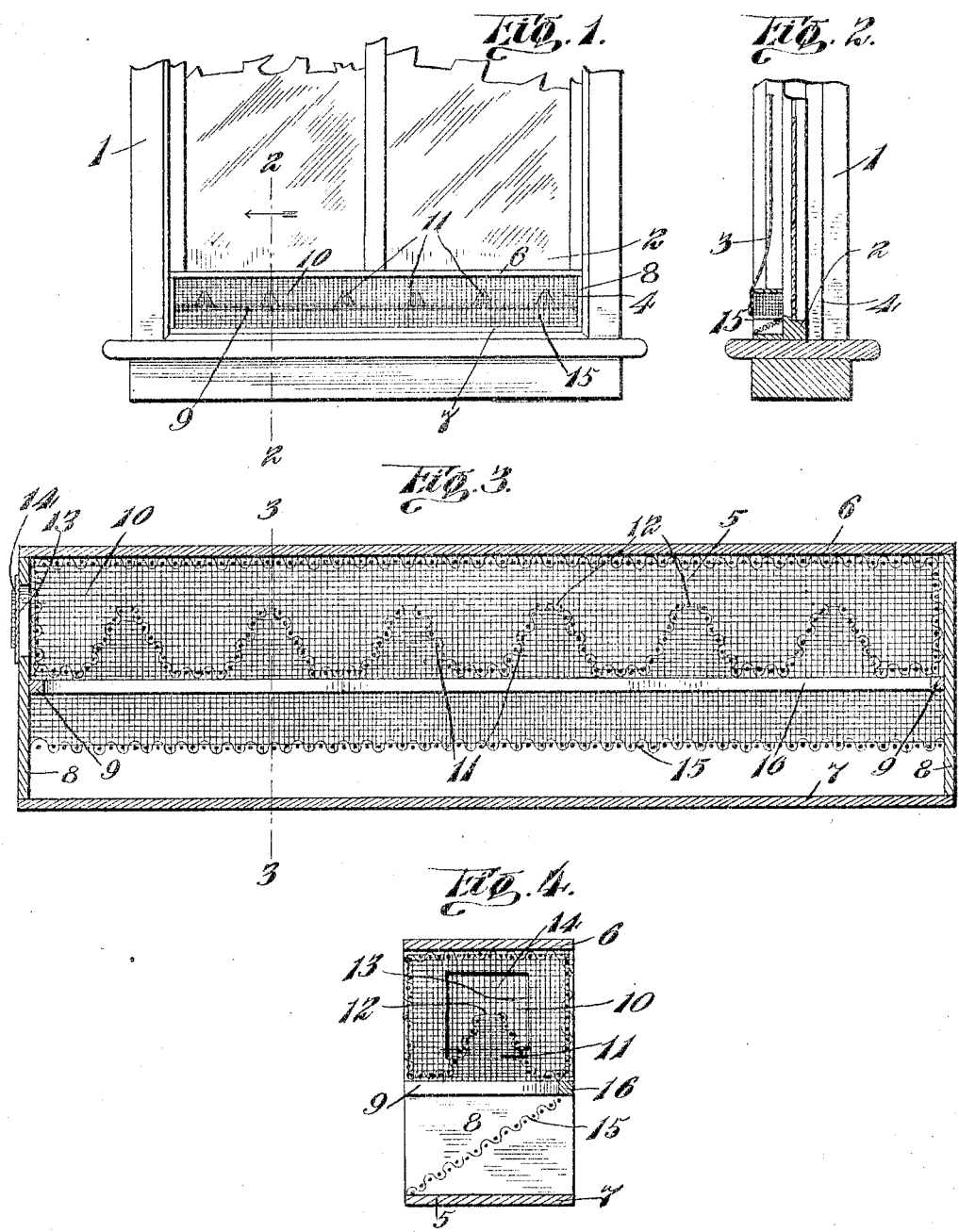

UNITED STATES PATENT OFFICE.

HUBERT T. CASEY, OF BRISTOL, VERMONT.

INSECT-TRAP.

SPECIFICATION forming part of Letters Patent No. 776,643, dated December 6, 1904.

Application filed August 4, 1904. Serial No. 219,494. (No model.)

*To all whom it may concern:*

Be it known that I, HUBERT T. CASEY, a citizen of the United States, residing at Bristol, in the county of Addison and State of Vermont, have invented certain new and useful Improvements in Insect-Traps; and I do declare the following to be a full, clear, and exact description of the invention, such as will enable others skilled in the art to which it appertains to make and use the same.

My invention relates to improvements in fly or insect traps of that class designed to be placed in a window-frame.

The object of my invention is to provide a device of this character which will be simple in construction, durable in use, efficient in operation, and comparatively inexpensive to manufacture.

With this and other objects in view the invention consists in certain novel features of construction, combination, and arrangement of parts, as will be more fully described, and particularly pointed out in the appended claims.

In the accompanying drawings, Figure 1 is a front elevation of a portion of a window-frame, showing the application of my improved fly-trap thereto. Fig. 2 is a vertical sectional view taken on the line 2 2 of Fig. 1. Fig. 3 is a vertical longitudinal sectional view through the trap. Fig. 4 is a vertical transverse sectional view taken on the line 3 3 of Fig. 3.

Referring to the drawings by numeral, 1 denotes a window-frame; 2, the lower sliding sash of same; 3, a window shade or curtain, and 4 my improved fly or insect trap. The latter is in the form of a rectangular frame 5, which is adapted to fit the window-frame and to be placed therein against the lower sash 2, as clearly shown in Figs. 1 and 2 of the drawings. Said frame 5 comprises the upper and lower pieces 6 and 7, which are connected by end pieces 8, the front and back of said frame being open.

Upon the inner faces of the two end pieces 8, adjacent to their centers, are secured two horizontally-disposed cleats 9, which are adapted to support in the upper portion of said frame a trap-receptacle 10, which is preferably rectangular in form and made of woven-wire fabric or other foraminous material. Said trap receptacle or box is adapted to fit the upper portion of said frame snugly; but, if desired, any suitable fastening means may be provided to secure said receptacle in position and at the same time permit it to be readily removed. In the bottom of said receptacle 10 is provided a series of upwardly and inwardly projecting cones 11, which form inlet openings or entrances for said receptacle, the extreme upper portion or apex of said cones being open, as shown at 12, to permit flies or other insects to pass into the trap. Any number of these cone-shaped entrances may be used; but I preferably provide six and arrange them as shown in Fig. 3. At one end of the trap-receptacle or at any other convenient point is formed a discharge-opening 13, which is adapted to be closed by a swinging door or other suitable cover 14. In the space below the trap-receptacle is secured an upwardly and outwardly inclined guide 15, which is preferably made of woven-wire fabric or other foraminous material. Said guide 15 extends from end to end of the frame and has its upper edge secured to a bar 16, which connects the two ends 8 of the frame. Said guide 15 is adapted to direct the flies or other insects upwardly into the cone-shaped entrances or openings 11.

In using my trap the same is placed upon the front portion of the window-sill. The length of the trap-frame, it will be understood, corresponds to the width of the window-frame, so that there will be no space at the ends of the trap through which the flies may pass. The window shade or curtain 3 is then pulled down, so that its lower end is disposed opposite the lower portion of the trap-receptacle, as shown in Fig. 2. The shades of the other windows of the room in which the trap is located are then pulled down, so that the flies or other insects will be attracted by the light passing through the trap. As the flies pass up the inclined guide 15 it directs them into the cone-shaped entrances of the trap, as will be readily understood. When it is desired to remove the flies from the trap-receptacle 10, the latter is removed from the frame 1 and the flies may then be taken from the same through the discharge-opening 13.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. An insect-trap comprising a frame adapted to be placed in a window and open on opposite sides, a trap-receptacle removably mounted in the upper portion of said frame through one of said open sides thereof and formed with inlet-openings in its lower side and with inlet-cones, the lower ends of which communicate with said openings, and an inclined guide in the lower portion of said frame for directing the insects toward said inlet-openings, substantially as described.

2. An insect-trap comprising an open rectangular frame, a trap-receptacle removably mounted in the upper portion of said frame and having one or more of its faces or sides formed of foraminous material, a series of cones of foraminous material in the bottom of said trap-receptacle forming inlet-passages therefor, a covered discharge-opening for said trap-receptacle, and an inclined foraminous guide mounted in said frame below said trap-receptacle, and adapted to direct the insects into said inlet-cones, substantially as described.

3. An insect-trap comprising an open rectangular frame having supporting-cleats upon the inner faces of its ends, a trap-receptacle of foraminous material supported upon said cleats within said frame, upwardly-projecting inlet-cones in the bottom of said trap-receptacle, and an outwardly and upwardly inclined foraminous guide secured in said frame beneath said trap-receptacle, substantially as described.

In testimony whereof I have hereunto set my hand in presence of two subscribing witnesses.

HUBERT T. CASEY.

Witnesses:
WILLIAM W. WILSON,
OWEN W. McSHANE.